Feb. 10, 1931.

F. H. ELLISON

Re. 17,961

GAME APPARATUS

Original Filed Aug. 24, 1917 2 Sheets-Sheet 1

Inventor

Frank H. Ellison,

By Stone, Boyden, Mack & Halm,

Attorneys

Feb. 10, 1931.

F. H. ELLISON

Re. 17,961

GAME APPARATUS

Original Filed Aug. 24, 1917 2 Sheets-Sheet 2

Inventor

Frank H. Ellison,

By Stone, Boyden, Mack & Halm,

Attorneys.

Reissued Feb. 10, 1931

Re. 17,961

UNITED STATES PATENT OFFICE

FRANK H. ELLISON, OF OGEMA, WISCONSIN, ASSIGNOR, BY MESNE ASSIGNMENTS, TO HACKLEY MORRISON, OF RICHMOND, VIRGINIA

GAME APPARATUS

Original No. 1,253,471, dated January 15, 1918, Serial No. 188,023, filed August 24, 1917. Application for reissue filed November 28, 1930. Serial No. 498,878.

This invention relates to games and toys and more particularly to game apparatus employing playing pieces or projectiles.

The main object of the invention is to construct an apparatus of this class which may be used equally well for the entertainment of both children and older persons, and may be played by any number of people.

Another object is to construct an apparatus employing channels and balls in which the balls are kept in continuous circulation by the players.

Another object is to construct an apparatus of this character having switch controlled ball channels for varying the course of the balls.

With the foregoing and other objects, in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
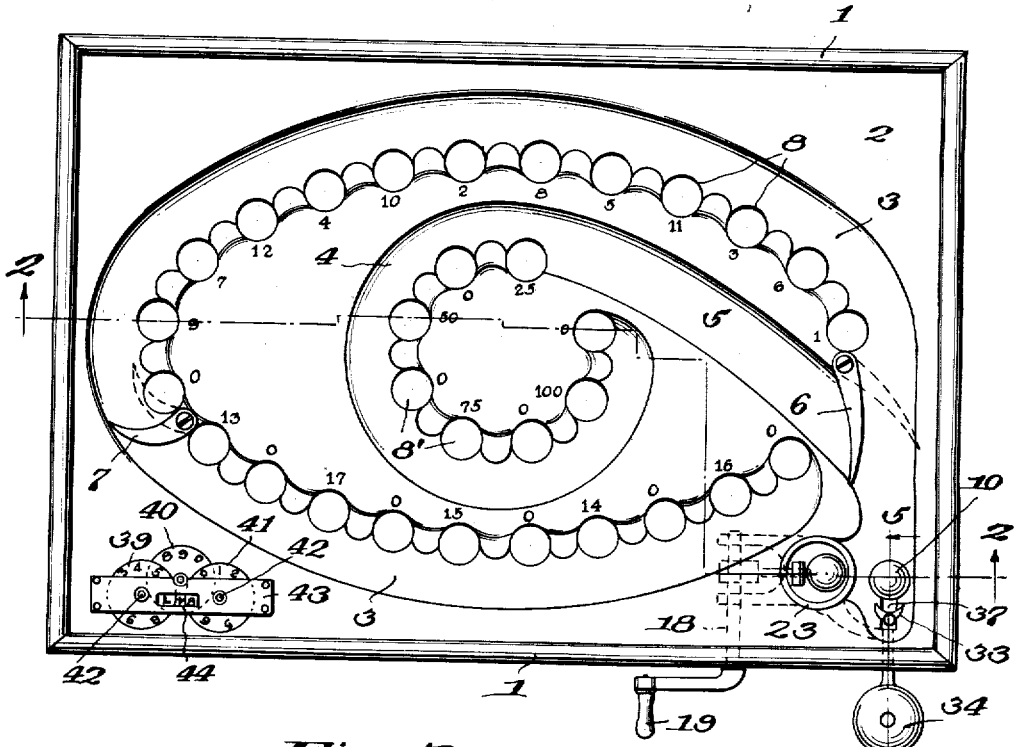
Figure 2:
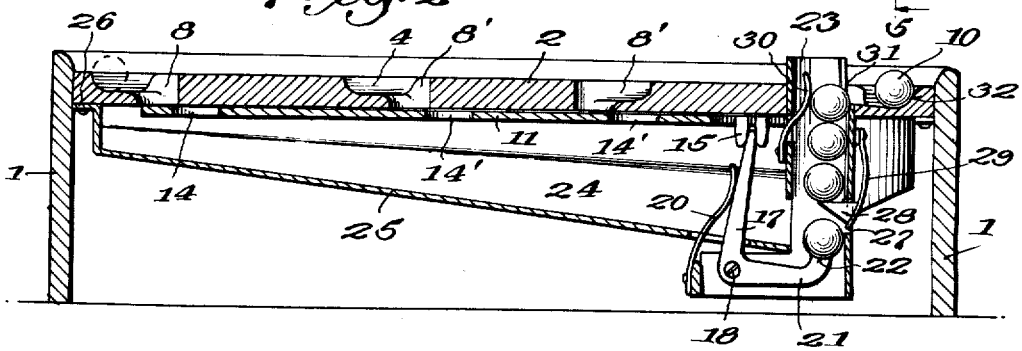
Figure 3:
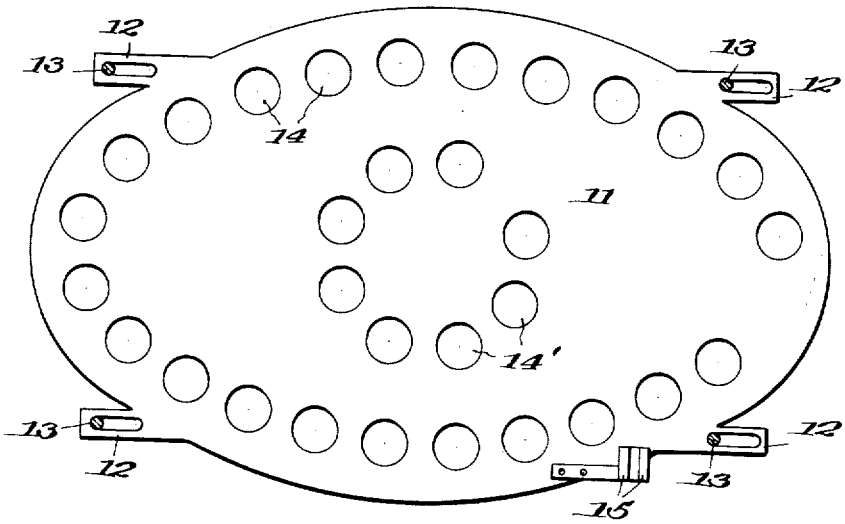
Figure 4:
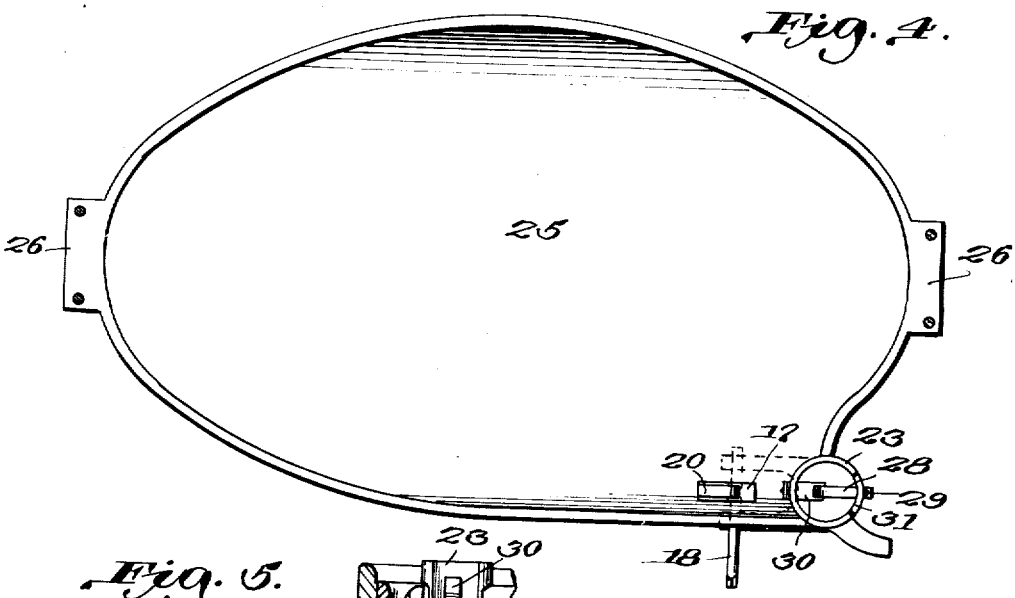
Figure 5:
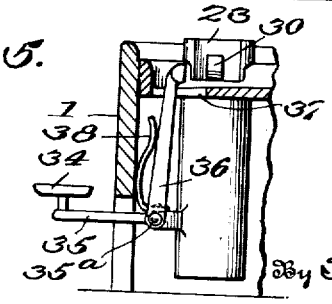

Figure 1 represents a top plan view of a game apparatus constructed in accordance with this invention, Fig. 2 is a longitudinal section taken on the line 2—2 of Fig. 1, Fig. 3 is a plan view of the sliding auxiliary top of the apparatus, the posts or studs which operate as guides for said top being shown in section, Fig. 4 shows a plan view of the inclined bottom of the apparatus detached, and Fig. 5 is a vertical detail section taken on the line 5—5 of Fig. 1.

The game apparatus constituting this invention is shown in the form of a hollow rectangular supporting frame 1 of a sufficient height to space its top 2 a distance above a table or other support on which the frame is to be mounted sufficient to provide ample room beneath said top for the operating mechanism of the apparatus.

The top or playing board 2 is made of any suitable material which is thick enough to provide for the formation therein of ball channels 3 and 4, channel 3 being here shown substantially ovate in configuration and extending around the greater portion of said top while the channel 4 which is arranged in the space bounded by the channel 3 is substantially circular in form with an entrance groove or channel 5 leading therefrom and merging into the entrance to channel 3 as is shown clearly in Fig. 1. A switch 6 is pivotally mounted at the junction of the entrances to the channels 3 and 4 and is adapted to be swung so as to permit the balls to enter either one or the other of said channels according to the position in which said switch is disposed. Another switch 7 is arranged to swing transversely across channel 3 at any suitable point, preferably at the end opposite to the entrance end of said channel and this switch may be swung inwardly into dotted line position shown in Fig. 1 when it is desired to permit the playing pieces to pass entirely around the channel and when swung into the open position shown in said figure will operate to obstruct them and permit their passage through a portion only of said channel.

Arranged around the inner edges of the channels 3 and 4 are a plurality of spaced seats or apertures 8 and 8′, any desired number of which may be employed and which extend through the top 2 and are designed to permit the passage of the playing pieces or balls 10 when said balls are projected by the player in a manner hereinafter more fully described.

An auxiliary top 11 is mounted to slide below top 2 and adjacent thereto and as shown in Fig. 3 is substantially oval in shape with longitudinally slotted ears 12 arranged at opposite sides thereof near its ends and through which are designed to pass studs 13 which depend from top 2 and operate as guides for the top 11, the extent of movement of said top being controlled by the length of the slots in the ears 12.

This auxiliary top 11 is provided adjacent its peripheral edge with a plurality of apertures 14 spaced apart a distance corresponding to the distance between the apertures 8 in the top 2 and are designed to register with said apertures 8 when the top 11 is shifted into proper position below board 2 to cause such alinement. This top is also provided with a plurality of centrally disposed circularly arranged apertures 14′ which are designed to register with the apertures 8′ at the center of top 2.

Mounted adjacent one edge of the auxiliary top 11 are a pair of depending spaced fingers or lugs 15. These depending fingers are designed to receive the free end of one arm of a bell crank 17 which is constructed to be actuated for shifting the top 11 back and forth. The bell crank 17 is fulcrumed on a shaft 18 mounted in suitable bearings carried by the frame 1 and which has an operating handle 19 disposed at its outer end to provide for the turning of the shaft and the rocking of the bell crank in a manner presently to be described. A spring 20 normally bears against the arm of the bell crank 17 which is positioned between the fingers 15 and operates to hold the auxiliary top 11 in retracted position as shown in Fig. 2 so that the apertures 14 and 14′ therein are normally out of register with the apertures 8 and 8′ in top 2.

The other arm 21 of the bell crank 17 has an upturned finger 22 which is positioned in a tube or ball pocket 23 arranged vertically in the frame 1 near one corner thereof as is shown clearly in Figs. 1 and 2 and which is designed to contain a plurality of superposed balls 10, the lowermost of which rests on the upper end of the finger 22 which is positioned vertically in said pocket as is shown clearly in Fig. 2. The lower end of this ball pocket 23 communicates with a chamber 24 formed between the lower face of the auxiliary top 11 and a downwardly and forwardly inclined bottom or runway 25 which is secured at its opposite ends to the opposite ends of top 2, flanges 26 being here shown for attaching said bottom to said top. The arm of the bell crank 17 which is disposed between the fingers 15 extends through bottom 25 near its lower end and the spring 20 also extends through the same aperture in said bottom through which said bell crank extends as is shown clearly in Fig. 2.

The ball pocket or tube 23 also has an opening 27 through one side wall thereof to provide for the passage of a ball-support or detent 28 which is carried by the free end of a spring 29 secured to the outer face of said pocket 23, said spring operating to resiliently force said support normally into the path of the balls to be contained in said pocket. The support 28 is beveled on its lower face so that when the ball below it is forced upwardly into the tube by the actuation of the bell crank 17 it will move said support laterally outward against the tension of its spring and permit the ball so elevated to pass by said support, which will then spring back into position below the ball and hold it and those above it within the tube in the form of a column as is shown clearly in Fig. 2.

Another spring 30 is mounted on the outer face of the tube or ball pocket 23 and extends through an aperture in the side wall thereof opposite to that containing the aperture through which the support 28 projects, and which is disposed at a point near the top of said pocket. This spring 30 is designed to bear against the uppermost ball of the column contained in the pocket so that when said ball reaches a certain point, the pressure of the spring will force it laterally out through an opening 31 onto a seat 32 arranged adjacent said tube. This seat 32 is positioned opposite a projector 33 controlled by a push button 34 which is carried by an arm 35 extending laterally from one side wall of the frame 1. This arm 35 constitutes one member of a bell crank pivoted to the tube 23 at 35ᵃ the other arm 36 of which projects upwardly through a slot 37 formed in top 2 and carries the ball projector or hammer head 33. This hammer head or projector 33 is here shown as having a concave face which conforms to the shape of the ball which it is designed to hit and which is forced against the ball on the release of the push button 34 by means of a spring 38 shown clearly in Fig. 5. It will thus be seen that when the push button 34 is depressed, the arm 36 of the bell crank will be forced rearwardly against the tension of spring 38 and when said button is released this spring will operate to forcibly move said arm forward causing the head 33 at its free end to engage the ball 10 disposed in its path and drive said ball forwardly causing it to enter ball channels 3 or 4 according to the direction in which the switch 6 is positioned, said ball entering the channel 4 when the switch is in the position shown in dotted lines in Fig. 1 and entering channel 3 when said switch is in its full line position shown in this figure.

Carried by the top 2, preferably at one corner thereof, is a registering or counting apparatus for registering the number of points made by players during the playing of a game. This registering apparatus, while it constitutes no part of the present invention, it being obvious that any other means for keeping the count may be employed, is here shown in the form of three dials 39, 40 and 41, bearing numerals from 1 to 9 on their outer faces and mounted to overlap each other, being provided with thumb nuts or knurled knobs 42 to facilitate the turning of said dials. As shown, these dials are mounted between the upper face of the top 2 and a plate 43 spaced suitably above said top to form a bearing support for the dials. This plate 43 is provided with a slot 44 positioned so that one of the numerals carried by each dial will be exposed therethrough as is shown clearly in Fig. 1, so that the dials may be turned to show the exact count through said opening.

The apertures 8 formed around the channel 3 are numbered as shown in Fig. 1 as are also the apertures 8′ arranged around channel 4 and are designed to be used in playing different games similar to the manner in which counts are made in a game of billiards.

This improved apparatus may be employed for playing a variety or number of games.

In the use of this apparatus, when the balls are in the position shown in Figs. 1 and 2, the player depresses the push button 34 and releases it thereby causing the hammer 33 to forcibly strike the ball 10 which is positioned on the seat 32 and drives it forward causing it to roll into one of the apertures in the channel into which it is directed. After this ball has entered the aperture 8 or 8′ in the top or board 2 and the player has taken note of the number of said aperture, he then depresses the crank handle 19 which causes the auxiliary top 11 to slide forward until its apertures 14 and 14′ are caused to register with the apertures 8 and 8′ in top 2 and thus permit the ball which has been projected to drop through said registering apertures onto the inclined bottom or runway 25. It will then roll down the inclined surface of said bottom into the ball pocket 23 onto the upstanding finger 22 of the bell crank 17 as is shown clearly in Fig. 2. It is understood that immediately the crank 19 is released that the spring 20 will operate to return the bell crank into normal position shown in Fig. 2 thereby retracting the auxiliary top 11 to position the apertures therein out of register with those in top 2 and to lower the finger 22 ready to receive the ball 10 which has rolled down the bottom 25 in the manner just above described. The actuation of the crank handle 19 in addition to sliding the top 11 also operates to project the ball which rests on its finger 22 upward causing it to pass the detent or support 27 and to thereby force the column of balls contained in said pocket upwardly so that the uppermost ball of the series reaches the point opposite the opening 31 in said pocket 33 and is forced laterally by the spring 30 into seat 32 ready for the next actuation of the push button 34.

It will thus be seen that this operation may be repeated by any desired number of players or each player may have any desired number of plays according to the rules of the game being played. It is also to be noted that the entrances to the channels in which the balls are to be directed are controlled by the position of the switches 6 and 7 in the manner above described.

While this improved apparatus is shown and described with the ball channels made ovate and circular, respectively, it is to be understood that they may be made of any desired configuration and with any desired number of holes or apertures arranged in any suitable or desired manner and that the frame 1 while shown rectangular, may be made of any other desired configuration.

By the arrangement and construction above described and shown, it will be obvious that the balls 10 may be kept continuously in circulation by the actuation of the crank handle 19 and the push button 34, the ball falling into position on the finger 22 and operable by the depression of the handle 19 to be forced upwardly into the tube or pocket and take the place of the ball which has been projected by the depression of the push button 34.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A game apparatus comprising a board having openings therethrough, a plate slidable under said board and having openings adapted to register with those in the board when the plate is disposed in one position, ball projecting means carried by said board, and means for simultaneously sliding said plate to position its apertures in registry with those of the board and to elevate one of the balls projected and discharged through said openings.

2. In a game apparatus, a board having openings therethrough, a plate mounted to slide below said board and having openings adapted to register with the openings in said board when the plate is in one position, a ball pocket communicating at one end with the upper face of said board, and a bell crank connected to actuate said sliding plate and to simultaneously elevate the ball in said pocket.

3. In a game apparatus, a board having openings therethrough, a plate mounted to slide below said board and having openings adapted to register with the openings in said board when the plate is in one position, a ball pocket communicating at one end with the upper face of said board, a bell crank connected to actuate said sliding plate and to simultaneously elevate the ball in said pocket, and a yieldable ball support operable transversely of said pocket.

4. In a game apparatus, a board having openings therethrough, a plate mounted to slide below said board and having openings adapted to register with the openings in said board when the plate is in one position, a ball pocket communicating at one end with the upper face of said board, a bell crank connected to actuate said sliding plate and to simultaneously elevate the ball in said pocket, and a yieldable ball support operable transversely of said pocket, said support having means whereby it is moved outwardly into inoperative position on the elevation of a ball from below.

5. In a game apparatus, a board having ball seats in its upper face, a ball pocket opening through said board, a plurality of balls fed through said pocket, a laterally yieldable support for said balls, a laterally yieldable ball engaging element positioned to force one of the balls from said pocket when it reaches a predetermined point therein, and projecting means for engaging the ball discharged from the pocket and to impel it over the face of said board.

6. In a game apparatus, a board having openings therethrough, a plate slidable under said board and provided with openings adapted to register with those in the board when the plate is in one position, a downwardly inclined bottom arranged below said sliding plate, a bell crank having one arm engaged with said sliding plate, a pocket opening at right angles through said board and into which the other arm of said bell crank projects, a ball support arranged in said pocket above said bell crank arm, and means for actuating said bell crank to cause one arm thereof to move said sliding plate to position the apertures into register with those of the board and its other arm to elevate the ball in said pocket to position it above the support therein, and means for automatically returning said bell crank to normal position.

7. In a game apparatus, a board having a plurality of ball channels formed on its upper face and provided at intervals with ball seats, switches for controlling the entrance to said ball channels, and means for projecting a ball to direct it through one of said channels.

8. In a game apparatus, a board having a switch controlled ball channel therein with ball seats arranged at intervals therearound, and a projector carried by said board for propelling a ball through said channel.

9. In a game apparatus, a board having a plurality of ball channels with ball seats arranged at intervals therearound, and a pivotally mounted switch arranged to cut off the entrance to one of said channels and to open the entrance of the other channel.

10. In a game apparatus, a board having a plurality of openings therethrough, a plate mounted to slide below said board and having openings adapted to register with those in the board when the plate is in one position, a ball pocket opening through said board and depending below said plate, a bottom arranged below said plate and inclined outwardly toward said pocket and communicating therewith at its lower end, a spring pressed bell crank having one arm connected with said plate and its other arm positioned in said pocket and provided with an upstanding ball supporting finger, means for actuating said bell crank to slide said plate and to elevate said ball supporting finger, and projecting means arranged adjacent said pocket on said board whereby a ball discharge from said pocket may be projected over said board.

11. In a game apparatus, a board having a plurality of openings therethrough, a plate mounted to slide below said board and having openings adapted to register with those in the board when the plate is in one position, a ball pocket opening through said board and depending below said plate, a bottom arranged below said plate and inclined outwardly toward said pocket and communicating therewith at its lower end, a spring pressed bell crank having one arm connected with said plate and its other arm positioned in said pocket and provided with an upstanding ball supporting finger, means for actuating said bell crank to slide said ball and to elevate said ball supporting finger, projecting means arranged adjacent said pocket on said board whereby a ball discharged from said pocket may be projected over said board, and a laterally yieldable element positioned at the upper end of said pocket for forcing the ball laterally outward into the path of said projector.

12. In a game apparatus, a board having a plurality of openings therein, a plate mounted to slide under said board and having openings adapted to register with those in the board when the plate is in one position, spring pressed means for normally holding said plate out of register with those in the board, means for actuating said spring pressed means to move said plate against the tension thereof to bring the openings therein into register with those of the board, a ball pocket opening through said board and extending below said plate and adapted to normally contain a plurality of playing balls, a spring connected at one end to said pocket and having a laterally extending ball support at its free end normally projected into the path of the balls to hold them in elevated position within the pocket, and means for projecting a ball into contact with said support for moving it outward against the tension of its spring for permitting the projected ball to be raised into a plane above said support.

13. In a game apparatus, a board having a plurality of openings therein, a plate mounted to slide under said board and having openings adapted to register with those in the board when the plate is in one position, spring pressed means for normally holding said plate with its openings out of register with those in the board, means for actuating said spring pressed means to move said plate against the tension thereof to bring the openings therein into register with those of the board, a ball pocket opening through said board and extending below said plate and adapted to normally contain a plurality of playing balls, a spring connected at one end to said pocket and having a laterally extending ball support at the free end normally projected into the path of the balls to hold them in elevated position within the pocket, and means for elevating a ball into contact with said support for moving it outward against the tension of its spring for permitting the elevated ball to be raised into a plane above said support, and a spring extending into said pocket near its upper end and adapted to engage the uppermost ball of the pocket to force it laterally outward when it reaches a predetermined point in the pocket.

14. A game apparatus comprising a board having openings therethrough, means for projecting a ball into one of said openings, and means for returning the projected ball into position for actuation by the projecting means, said ball returning means comprising a ball pocket in the form of a vertically disposed tube, constructed to engage and guide the ball, and mechanism for forcing the ball up through said tube.

15. A game apparatus comprising a board having openings therethrough, means for projecting a ball into one of said openings, and means for returning the projected ball into position for actuation by the projecting means, said ball returning means comprising a downwardly inclined runway disposed below the board, along which runway the ball is caused to roll by gravity, a ball pocket in the form of a tube constructed to engage and guide the ball, said tube extending upwardly from the lowest point of said runway and having adjacent thereto an opening by which the ball may enter said tube, and mechanism for elevating the ball through said tube.

16. A game apparatus comprising a board having openings therethrough, a plurality of playing balls for passage through said openings, means for projecting a ball into one of said openings, and means for keeping said balls in circulation by returning them successively into position for actuation by the projecting means, said last mentioned means comprising a downwardly inclined surface disposed beneath the board, an upwardly extending tube having its lower end positioned to receive the balls rolling down said inclined surface, and mechanism for elevating and supporting said balls in said tube to form a column and for moving said column up through said tube, whereby said balls are discharged one-by-one from the upper end thereof.

17. A game apparatus comprising a board having openings therethrough, a plurality of playing balls for passage through said openings, means for projecting a ball into one of said openings, and means for returning the projected balls successively into position for actuation by the projecting means, said ball returning means comprising an upwardly extending tube, a downwardly inclined runway disposed beneath the board to receive the balls passing through said openings and constructed to deliver them into the lower end of said tube, a vertically movable member and means for actuating the same to cause it to engage each ball entering said tube and force it upward, within the same, and a yielding detent projecting into said tube at a point above said member and serving to support the balls in the form of a column, said detent being capable of lateral movement to permit the upward travel of the balls past the same.

18. A game apparatus comprising a horizontal board having openings therethrough, a plurality of playing balls for passage through said openings, means for projecting a ball into one of said openings, and means for returning the projected balls successively into position for actuation by the projecting means, said ball returning means comprising a vertically disposed ball pocket in the form of a tube having a lateral ball receiving inlet at its lower end, means for delivering by gravity the projected balls into said inlet, mechanism for successively forcing upwardly the balls entering said inlet, and means for supporting the balls, thus forming a column of balls within said tube, said projecting means comprising an arm pivoted below said board adjacent said tube to swing in a vertical plane, and means for deflecting toward said arm the balls discharged from the upper end of said tube.

19. A game apparatus comprising a board having openings therethrough, a plurality of playing balls for passage through said openings, means for projecting a ball into one of said openings, and means for returning the projected balls successively into position for actuation by the projecting means, said ball returning means comprising a vertically disposed ball pocket in the form of a tube having a ball receiving inlet at its lower end, means for delivering the projected balls by gravity into said inlet, mechanism for successively forcing upwardly the balls entering said inlet, thus forming a column of balls within said tube and discharging the balls from the upper end of said tube, and a yielding detent projecting into said tube and serving to support said column of balls.

20. A game apparatus comprising a board having a ball channel with an opening communicating therewith, balls for passage through said channel and opening, and means for keeping said balls in circulation, said means comprising a vertically disposed ball pocket arranged to engage and guide the balls, and mechanism for forcing said balls upwardly through said pocket and discharging them from the upper end thereof.

21. A game apparatus comprising a board having ball seats, means for projecting a ball into one of said seats, and means for returning the projected ball into position for actuation by the projecting means, said ball returning means comprising a downwardly inclined runway disposed below the board, along which runway the ball is caused to roll by gravity, a ball pocket in the form of a tube constructed to engage and guide the ball, said tube extending upwardly from the lowest point of said runway and having adjacent thereto an opening by which the ball may enter said tube, and mechanism for elevating the ball through said tube.

22. A game apparatus comprising a board having openings therethrough constituting ball seats, a plate movably mounted beneath said board and serving to support a ball within one of said openings, means for projecting a ball into one of said seats, and means for returning the projected ball into position for actuation by the projecting means.

23. A game apparatus comprising a horizontal board having openings therethrough, a plurality of playing balls for passage through said openings, means for projecting a ball into one of said openings, and means for keeping said balls in circulation by returning them successively into position for actuation by the projecting means, said last mentioned means comprising a downwardly inclined surface disposed beneath the board, an upwardly extending tube having its lower end positioned to receive the balls rolling down said inclined surface, mechanism for elevating and supporting said balls in said tube to form a column and for moving said column up through said tube, and means for discharging said balls laterally one-by-one from the upper end thereof, and said projecting means comprising an arm disposed adjacent said tube at the side on which the balls are discharged, said arm being pivoted at a point below said board to swing in a vertical plane.

In testimony whereof I affix my signature.

FRANK H. ELLISON.

CERTIFICATE OF CORRECTION.

Reissue Patent No. 17,961. Granted February 10, 1931, to

FRANK H. ELLISON.

It is hereby certified that error appears in the printed specification of the above numbered patent requiring correction as follows: Page 6, after line 54, insert the following as claims 24 and 25:-

24. A game apparatus comprising a horizontal board having openings therethrough constituting ball seats, a support slidably mounted beneath said board and serving when in one position to retain a ball within one of said openings, means for projecting a ball into one of said seats, means for shifting said support to release the ball, so that it falls by gravity through the opening, and means for returning the projected and released ball into position for actuation by the projecting means, said ball returning means comprising a downwardly inclined runway disposed below the board, a tube extending upwardly from the lowest point of said runway and having adjacent thereto an opening by which the ball may enter said tube, and mechanism for elevating the ball through said tube.

25. A game apparatus comprising a board having openings therethrough, a plurality of playing balls for passage through said openings, means for projecting a ball into one of said openings, and means for returning the projected balls successively into position for actuation by the projecting means, said ball returning means comprising an upwardly extending tube, a downwardly inclined runway disposed beneath the board to receive the balls passing through said openings and constructed to deliver them into said tube, a vertically movable member and means for actuating the same to cause it to engage each ball entering said tube and force it upward, within the same, and a yielding detent projecting into the path of the balls at a point above said member and serving to successively support the balls, said detent being capable of lateral movement to permit the upward travel of the balls past the same.;

and that the said Letters Patent should be read with this correction therein that the same may conform to the record of the case in the Patent Office.

Signed and sealed this 24th day of March, A. D. 1931.

(Seal)

M. J. Moore,
Acting Commissioner of Patents.